US009524264B2

(12) United States Patent
Amon et al.

(10) Patent No.: US 9,524,264 B2
(45) Date of Patent: Dec. 20, 2016

(54) GENERATING COMBINED BUS CLOCK SIGNALS USING ASYNCHRONOUS MASTER DEVICE REFERENCE CLOCKS IN SHARED BUS SYSTEMS, AND RELATED METHODS, DEVICES, AND COMPUTER-READABLE MEDIA

(71) Applicant: QUALCOMM Incorporated, San Diego, CA (US)

(72) Inventors: Yossi Amon, Kiryat Tivon (IL); David Asher Friedman, Zichron-Yaakov (IL); Ben Levin, Haifa (IL); Sharon Graif, Zichron-Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 14/316,026

(22) Filed: Jun. 26, 2014

(65) Prior Publication Data

US 2015/0378955 A1    Dec. 31, 2015

(51) Int. Cl.
*G06F 13/36* (2006.01)
*G06F 13/42* (2006.01)
*G06F 13/364* (2006.01)

(52) U.S. Cl.
CPC ......... *G06F 13/4226* (2013.01); *G06F 13/364* (2013.01); *G06F 13/4291* (2013.01)

(58) Field of Classification Search
CPC .... G06F 13/4226; G06F 13/362; G06F 13/36; G06F 13/4282; G06F 13/4291; G06F 13/1605; G06F 13/364
See application file for complete search history.

(56) References Cited

U.S. PATENT DOCUMENTS

| 4,371,925 A | 2/1983 | Carberry et al. |
| 6,338,150 B1 | 1/2002 | Johnson et al. |
| 6,906,570 B2 | 6/2005 | Kim |
| 7,043,657 B1 | 5/2006 | Yang et al. |
| 7,567,629 B2 | 7/2009 | Fredriksson |
| 2012/0198266 A1 | 8/2012 | Hofmann et al. |

OTHER PUBLICATIONS

MIPI Alliance, Inc., "MIPI Alliance Specification for System Power Management Interface (SPMI)," Version 2.0, Mar. 14, 2012, pp. 1-89 (91 total pages).
NXP Semiconductors: "I2C-bus specification and user manual," UM10204, Rev. 6, Apr. 4, 2014, pp. 1-64.
Philips Semiconductors, "The I$^2$C-bus specification," XP-002678058, Version 2.1, Jan. 2000, 46 pages.
International Search Report and Written Opinion for PCT/US2015/037654, mailed Sep. 10, 2015, 11 pages.

*Primary Examiner* — Farley Abad
(74) *Attorney, Agent, or Firm* — Withrow & Terranova, PLLC (57) ABSTRACT

Generating combined bus clock signals using asynchronous master device reference clocks in shared bus systems, and related methods, devices, and computer-readable media are disclosed. In one aspect, a method for generating combined bus clock signals comprises detecting a start event by each master device of multiple master devices communicatively coupled to a shared clock line of a shared bus. Each master device samples a plurality of shared clock line values of the shared clock line at a corresponding plurality of transitions of a reference clock signal for the master device. Each master device determines whether the plurality of shared clock line values is identical. If the shared clock line values are identical, each master device drives a shared clock line drive value inverse to the plurality of shared clock line values to the shared clock line at a next transition of the reference clock signal for the master device.

25 Claims, 6 Drawing Sheets

GENERATING COMBINED BUS CLOCK SIGNALS USING ASYNCHRONOUS MASTER DEVICE REFERENCE CLOCKS IN SHARED BUS SYSTEMS, AND RELATED METHODS, DEVICES, AND COMPUTER-READABLE MEDIA

BACKGROUND

I. Field of the Disclosure

The technology of the disclosure relates generally to bus systems shared among multiple master devices.

II. Background

Modern computer processors make use of a variety of bus standards to provide connectivity among master devices and between master devices and slave devices. One type of bus standard provides a shared bus protocol, under which a bus resource may serve more than one master device. Each master device may use its own reference clock signal to synchronize internal communications and operations, with each reference clock signal potentially being asynchronous in relation to others. As a consequence of using asynchronous reference clock signals, synchronizing operations involving more than one master device without a common clock signal external to the master devices may pose challenges.

Bus arbitration for determining which master device may use a shared bus for data transfer at a given time is one example in which synchronizing operations among multiple master devices may be problematic. Some bus protocols provide that, at any given time, one master device is known to be the bus master. The bus master drives the bus data and clock lines until mastership is handed over to the next bus master. Under these protocols, arbitration to determine the bus master for a next data transfer is carried out using a bus clock signal provided by the current bus master.

However, some bus protocols do not provide for an agreed upon clock owner during arbitration. Such protocols may provide "clockless" arbitration based on the reference clock signals of the master devices participating in arbitration. With clockless arbitration, the master devices implement a time-based protocol for generating a clock signal for arbitration, to be followed after a defined start event occurs. However, clockless arbitration typically requires restrictions on the reference clock signals to account for clock drifts and differences in clock phase and frequency. As a result, clockless arbitration may be difficult to implement and manage, and reference clock restrictions for clockless arbitration may hamper the design flexibility of chip designers.

SUMMARY OF THE DISCLOSURE

Aspects disclosed in the detailed description include generating combined bus clock signals using asynchronous master device reference clocks in shared bus systems. Related methods, devices, and computer-readable media are also disclosed. In this regard, in one exemplary aspect, a method for generating a combined bus clock signal for use by master devices coupled to a shared bus is provided. Each master device detects a start event on the shared bus (such as a start of bus arbitration, as a non-limiting example). The master devices then each sample a shared clock line value on a shared clock line of the shared bus at regular intervals corresponding to transitions of a reference clock signal for each master device. If a master device determines that the sampled shared clock line values are identical for a predetermined number of samples, the master device drives an inverse shared clock line drive value to the shared clock line at a next transition of the master device's reference clock. Over a period of time, the interactions of the master devices with the shared clock line give rise to a combined bus clock signal on the shared clock line that may then be used (e.g., during arbitration) by the master devices to drive a shared data line of the shared bus. In addition to having the benefit of allowing a relatively large variance among frequencies of the reference clock signals of the master devices, the method disclosed herein has the added advantage of enabling generation of a combined bus clock signal on higher-frequency buses without causing clock collisions among the master devices.

In another aspect, a method for generating combined bus clock signals is provided. The method comprises detecting a start event by each master device of one or more master devices communicatively coupled to a shared clock line of a shared bus. The method further comprises sampling, by each master device, a plurality of shared clock line values of the shared clock line at a corresponding plurality of transitions of a reference clock signal for the master device. The method also comprises determining, by each master device, whether the plurality of shared clock line values is identical. The method additionally comprises, responsive to determining that the plurality of shared clock line values is identical, driving, by each master device, a shared clock line drive value inverse to the plurality of shared clock line values to the shared clock line at a next transition of the reference clock signal for the master device.

In another aspect, a master device is provided. The master device comprises a communications interface communicatively coupled to a shared bus comprising a shared clock line, and a control system. The control system is configured to detect a start event on the shared clock line. The control system is further configured to sample a plurality of shared clock line values of the shared clock line at a corresponding plurality of transitions of a reference clock signal for the master device. The control system is also configured to determine whether the plurality of shared clock line values is identical. The control system is additionally configured to, responsive to determining that the plurality of shared clock line values is identical, driving a shared clock line drive value inverse to the plurality of shared clock line values to the shared clock line at a next transition of the reference clock signal for the master device.

In another aspect, a master device is provided. The master device comprises a means for detecting a start event on a shared clock line of a shared bus. The master device further comprises a means for sampling a plurality of shared clock line values of the shared clock line at a corresponding plurality of transitions of a reference clock signal for the master device. The master device also comprises a means for determining whether the plurality of shared clock line values is identical. The master device additionally comprises a means for, responsive to determining that the plurality of shared clock line values is identical, driving a shared clock line drive value inverse to the plurality of shared clock line values to the shared clock line at a next transition of the reference clock signal for the master device.

In another aspect, a non-transitory computer-readable medium having stored thereon computer-executable instructions is provided. The computer-executable instructions cause a processor to detect a start event on a shared clock line of a shared bus. The computer-executable instructions further cause the processor to sample a plurality of shared clock line values of the shared clock line at a corresponding plurality of transitions of a reference clock signal. The computer-executable instructions also cause the processor to determine whether the plurality of shared clock line values is identical. The computer-executable instructions also cause the processor to, responsive to determining that the plurality of shared clock line values is identical, drive a shared clock line drive value inverse to the plurality of shared clock line values to the shared clock line at a next transition of the reference clock signal.

In another aspect, a method for generating combined bus clock signals is provided. The method comprises, at a first master device, detecting a start event at the first master device communicatively coupled to a shared clock line of a shared bus. The first master device samples a plurality of shared clock line values of the shared clock line at a corresponding plurality of transitions of a reference clock signal for the first master device. The method further comprises determining whether the plurality of shared clock line values is identical. Responsive to determining that the plurality of shared clock line values is identical, the first master device drives a shared clock line drive value inverse to the plurality of shared clock line values to the shared clock line at a next transition of the reference clock signal for the first master device. Concurrently, at a second master device communicatively coupled to the shared clock line of the shared bus, the start event is detected. The second master device samples a second plurality of shared clock line values of the shared clock line at a corresponding second plurality of transitions of the reference clock signal for the second master device, and determines whether the second plurality of shared clock line values is identical. Responsive to determining that the second plurality of shared clock line values is identical, he second master device drives a second shared clock line drive value inverse to the second plurality of shared clock line values to the shared clock line at the next transition of the reference clock signal for the second master device. Collectively, between actions of the first master device and the second master device, a combined clock signal is created on the shared clock line.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include generating combined bus clock signals using asynchronous master device reference clocks in shared bus systems. Related methods, devices, and computer-readable media are also disclosed. In this regard, in one exemplary aspect, a method for generating a combined bus clock signal for use during arbitration by master devices coupled to a shared bus is provided. Each master device detects a start event on the shared bus (such as a start of bus arbitration, as a non-limiting example). The master devices then each sample a shared clock line value on a shared clock line of the shared bus at regular intervals corresponding to transitions of a reference clock signal for the master device. If a master device determines that the sampled shared clock line values are identical for a predetermined number of samples, the master device drives an inverse shared clock line drive value to the shared clock line at a next transition of the master device's reference clock. Over a period of time, the interactions of the master devices with the shared clock line give rise to a combined bus clock signal on the shared clock line that may then be used during arbitration by the master devices to drive a shared data line of the shared bus. In addition to having the benefit of allowing a relatively large variance among frequencies of the reference clock signals of the master devices, the method disclosed herein has the added advantage of enabling generation of a combined bus clock signal on higher-frequency buses without causing clock collisions among the master devices.

Figure 1:
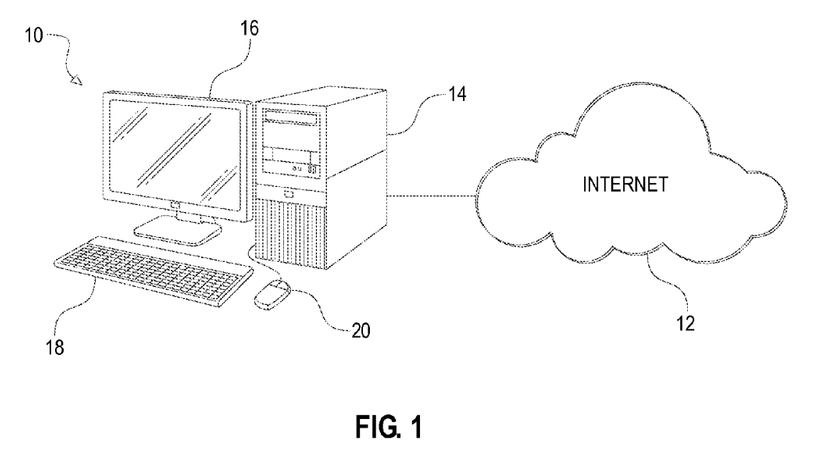
FIG. 1 is a simplified view of a computing device that may include master devices accessing a shared bus.
Figure 2:
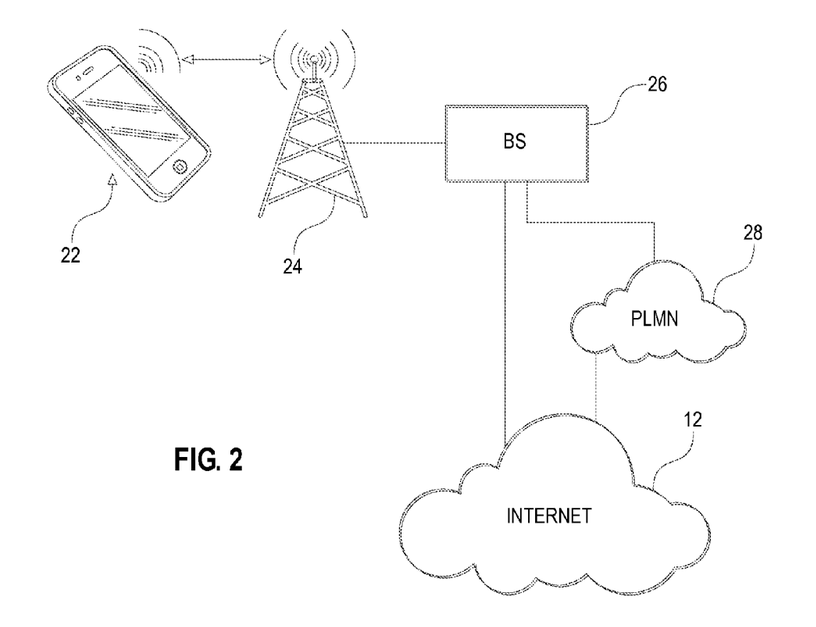
FIG. 2 is a perspective view of a mobile terminal that may include master devices accessing a shared bus.
Figure 3:
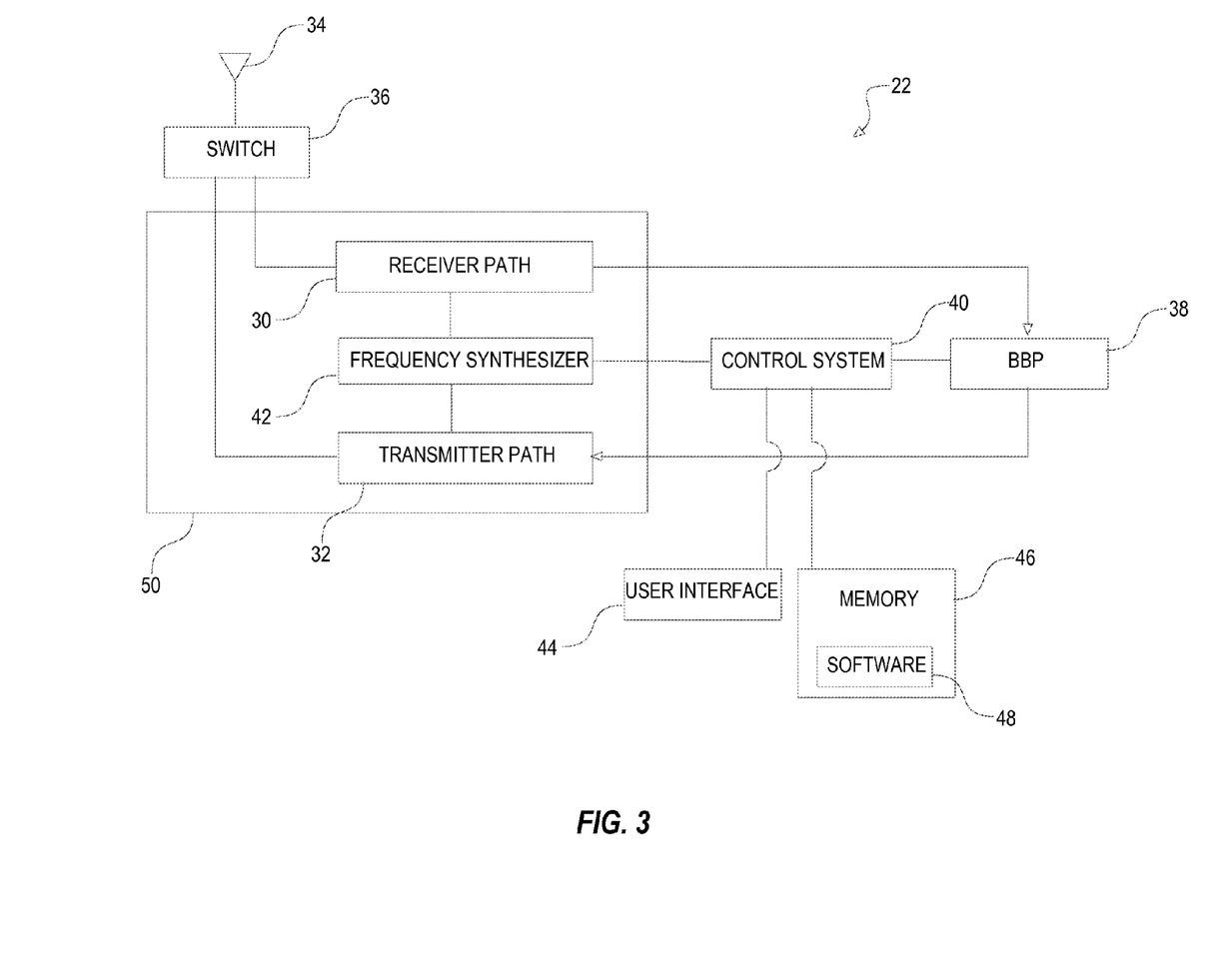
FIG. 3 is a block diagram of components of the mobile terminal of FIG. 2.

Before discussing generation of combined bus clock signals using asynchronous master device reference clocks, exemplary devices in which aspects of the present disclosure may be implemented are first described with reference to FIGS. 1-3. FIGS. 1 and 2 illustrate a computing device and a mobile terminal, respectively, while FIG. 3 illustrates components of FIG. 2 in greater detail. Exemplary aspects of the present disclosure are then discussed beginning at FIG. 4 below.

While an exemplary aspect of the present disclosure contemplates use in a mobile terminal, such as a cellular phone, the present disclosure is not so limited. In this regard, FIG. 1 illustrates a computing device 10 coupled to a network 12, which, in an exemplary aspect, is the internet. The computing device 10 may include a housing 14 with a central processing unit (CPU) (not shown) therein. A user (not shown) may interact with the computing device 10 through a user interface formed from input/output elements, such as a monitor (sometimes referred to as a display) 16, a keyboard 18, and/or a mouse 20. In some aspects, the monitor 16 may be incorporated into the housing 14. While the keyboard 18 and the mouse 20 are illustrated, the monitor 16 in some aspects may be a touchscreen display, which may supplement or replace the keyboard 18 and/or the mouse 20. Other input/output devices may also be present as is well understood in conjunction with desktop- or laptop-style computing devices.

In addition to the computing device 10, the exemplary aspects of the present disclosure may also be implemented on mobile computing devices. In this regard, an exemplary aspect of a mobile terminal 22 is illustrated in FIG. 2. The mobile terminal 22 may be a smart phone, such as a SAMSUNG GALAXY™ or APPLE iPHONE®. Instead of a smart phone, the mobile terminal 22 may be a cellular telephone, a tablet, a laptop, or other mobile computing device. The mobile terminal 22 may communicate with a remote antenna 24 associated with a base station (BS) 26.

The BS 26 may communicate with a public land mobile network (PLMN) 28, a public switched telephone network (PSTN) (not shown), or a network 12 (e.g., the internet). The PLMN 28 may communicate with the internet (e.g., the network 12) either directly or through an intervening network. It should be appreciated that most contemporary mobile terminals 22 allow for various types of communication with elements of the network 12. As non-limiting examples, streaming audio, streaming video, and/or web browsing are all common functions on most contemporary mobile terminals 22. Such functions are enabled through applications stored in memory of the mobile terminal 22 and by using a wireless transceiver of the mobile terminal 22.

A more detailed depiction of the components of the mobile terminal 22 of FIG. 2 is provided with reference to FIG. 3. In this regard, a block diagram of some of the elements of the mobile terminal 22 is illustrated. The mobile terminal 22 may include a receiver path 30, a transmitter path 32, an antenna 34, a switch 36, a baseband processor (BBP) 38, a control system 40, a frequency synthesizer 42, a user interface 44, and memory 46 with software 48 stored therein.

The receiver path 30 receives information-bearing radio frequency (RF) signals from one or more remote transmitters provided by the BS 26 of FIG. 2. A low noise amplifier (not shown) amplifies the signal. A filter (not shown) minimizes broadband interference in the received signal, while down-conversion and digitization circuitry (not shown) down-converts the filtered, received signal to an intermediate or baseband frequency signal, which is then digitized into one or more digital streams. The receiver path 30 typically uses one or more mixing frequencies generated by the frequency synthesizer 42. The BBP 38 processes the digitized received signal to extract the information or data bits conveyed in the signal. As such, the BBP 38 is typically implemented in one or more digital signal processors (DSPs).

With continued reference to FIG. 3, on the transmit side, the BBP 38 receives digitized data representing voice, data, or control information, as non-limiting examples, from the control system 40. The BBP 38 encodes the digitized data for transmission and outputs the encoded data to the transmitter path 32, where it is used by a modulator (not shown) to modulate a carrier signal at a desired transmit frequency. An RF power amplifier (not shown) amplifies the modulated carrier signal to a level appropriate for transmission, and delivers the amplified and modulated carrier signal to the antenna 34 through the switch 36. Collectively, the receiver path 30, the transmitter path 32, and the frequency synthesizer 42 may be considered to be a wireless modem 50.

With continued reference to FIG. 3, a user may interact with the mobile terminal 22 via the user interface 44, such as via a microphone, a speaker, a keypad, and/or a display, as non-limiting examples. Audio information encoded in the received signal is recovered by the BBP 38, and converted into an analog signal suitable for driving the speaker. The keypad and display enable the user to interact with the mobile terminal 22. For example, the keypad and display may enable the user to input numbers to be dialed, access address book information, or the like, as well as monitor call progress information. The memory 46 may have the software 48 therein as noted above, which may effectuate exemplary aspects of the present disclosure. While not illustrated, it is to be understood that a less mobile computing device 10 may have similar elements, but instead of the wireless modem 50, the computing device 10 may provide a network interface controller (NIC) having a wire-based interface to effectuate communications.

Figure 4:
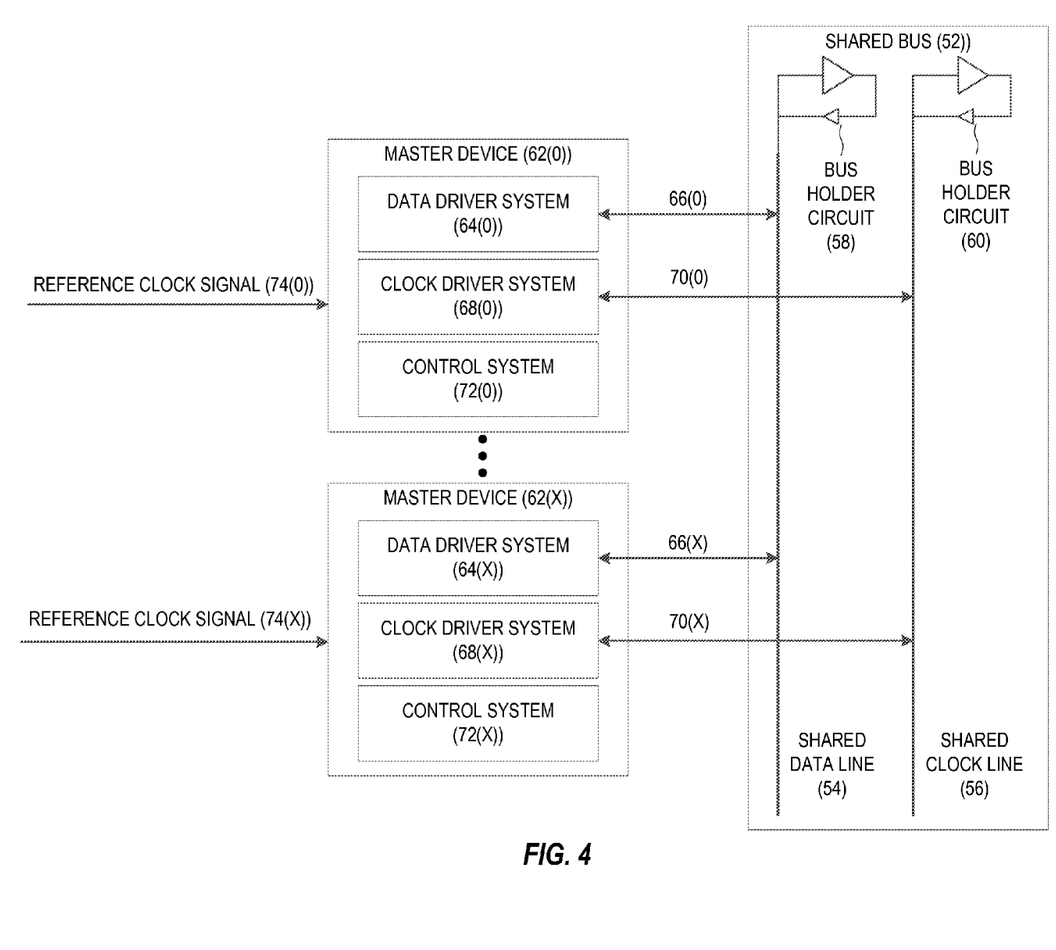
FIG. 4 is a block diagram illustrating a shared bus topology including master devices accessing a shared bus implemented using bus holder circuits.

One or more of the components illustrated in FIG. 3 may comprise master devices that are each connected to the same bus data and clock lines in a shared bus topology. In this regard, FIG. 4 is provided to illustrate the shared bus topology. In FIG. 4, a shared bus 52 includes a shared data line 54 and a shared clock line 56. In this example, the shared data line 54 and the shared clock line 56 are implemented using bus holder circuits 58 and 60, respectively, which operate to retain the value of the shared data line 54 and the shared clock line 56 to their most recent valid value (0 or 1). It should be appreciated that some aspects may provide other types of bus connections in addition to or instead of the shared data line 54.

The shared bus topology of FIG. 4 also includes a plurality of master devices 62(0)-62(X). The master devices 62(0)-62(X) provide data driver systems 64(0)-64(X), respectively, for driving data to and receiving data from the shared data line 54 via respective data lines 66(0)-66(X). The master devices 62(0)-62(X) further include clock driver systems 68(0)-68(X), respectively, for driving clock values to and sampling clock values from the shared clock line 56 via respective data lines 70(0)-70(X). Control systems 72(0)-72(X) direct operations of the respective data driver systems 64(0)-64(X) and the clock driver systems 68(0)-68(X). The master devices 62(0)-62(X) receive reference clock signals 74(0)-74(X), respectively, which are used to synchronize internal communications and operations of the master devices 62(0)-62(X). The reference clock signals 74(0)-74(X) may be generated by the master devices 62(0)-62(X), or may be based on an external clock source (not shown).

It is to be understood that the reference clock signals 74(0)-74(X) are generally asynchronous and may have different frequencies. For this reason, synchronizing operations involving more than one of the master devices 62(0)-62(X) without a common clock signal external to the master devices 62(0)-62(X) may pose challenges. As a non-limiting example, bus arbitration for determining which of the master devices 62(0)-62(X) may use the shared bus 52 for data transfer at a given time may be problematic. While "clockless" arbitration protocols may be used, they typically require restrictions on the reference clock signals 74(0)-74(X) to account for clock drifts and differences in clock phase and frequency. As a result, clockless arbitration may be difficult to implement and manage.

In this regard, aspects of the present disclosure provide a protocol for generating a combined bus clock signal on the shared clock line 56 using the reference clock signals 74(0)-74(X) of the master devices 62(0)-62(X). The combined bus clock signal is generated by the master devices 62(0)-62(X) after an initial start event is detected (e.g., a start of bus arbitration). Each of the master devices 62(0)-62(X) samples a shared clock line value on the shared clock line 56, and drives an inverse value if the sampled shared clock line values are identical for more than a predetermined number of samples. For example, if the master device 62(0) samples a value of one (1) from the shared clock line 56 for a predetermined number of samples, the master device 62(0) will drive a value of zero (0) to the shared clock line 56. In some aspects, the predetermined number of samples is two (2), although three (3) or more may be used. The inverse value driven to the shared clock line 56 may then be used as the next sampled shared clock line value. In this manner, a combined bus clock signal emerges on the shared clock line 56 that is sufficient to be used to synchronize the master devices 62(0)-62(X) during operations such as bus arbitration.

The shared clock line values are sampled at uniform points in time based on transitions of the reference clock signals 74(0)-74(X) of the respective master devices 62(0)-62(X). For example, the shared clock line values may be sampled at a rising edge of each of the reference clock signals 74(0)-74(X), or at a falling edge of each of the reference clock signals 74(0)-74(X). The inverse value is then driven to the shared clock line 56 at the next transition.

To avoid electrical contention over the shared clock line 56, some aspects may require the frequencies of the reference clock signals 74(0)-74(X) to be restricted such that the slowest frequency is within a predefined ratio of the fastest frequency. For example, in aspects where two (2) samples are compared, the ratio of the fastest frequency to the slowest frequency may be 4:3 (calculated based on a duty cycle of 50% for each of the reference clock signals 74(0)-74(X)). In such aspects, the frequency of the generated combined bus clock signal is approximately one-fourth of the fastest frequency.

Some aspects may increase the range of supported frequencies by comparing three (3) samples when determining when to drive an inverse value to the shared clock line 56. When utilizing three samples, the ratio of the fastest frequency to the slowest frequency may increase to 3:2 or more. While such three-sample aspects provide an increase in contention margin over two-sample aspects, the frequency of the generated combined bus clock signal may be correspondingly lower, at approximately one-sixth of the fastest frequency.

In some aspects, the range of supported frequencies may be increased by shortening the drive time of clock pulses from the clock driver systems 68 of the master devices 62 of FIG. 4. For example, the clock driver systems 68 may employ an uneven clock shape signal (e.g., using a duty cycle of less than 50% for the "high" state). In aspects where two (2) samples are compared, the use of shorter drive pulses may enable the ratio of the fastest frequency to the slowest frequency to be increased relative to the 4:3 ratio discussed above, while still providing the generated combined bus clock signal of approximately one-fourth of the fastest frequency. According to some aspects employing uneven clock shape signals, the sampling of shared clock line values and the driving of shared clock line drive values may occur at successive transitions (i.e., a rising edge and a subsequent falling edge) of the reference clock signals 74(0)-74(X), as long as the time period between each sample and drive is uniform. Some aspects may provide that the clock driver systems 68 may use a dedicated input/output PHY device to turn off a drive signal based on feedback from the shared clock line 56.

Figure 5:
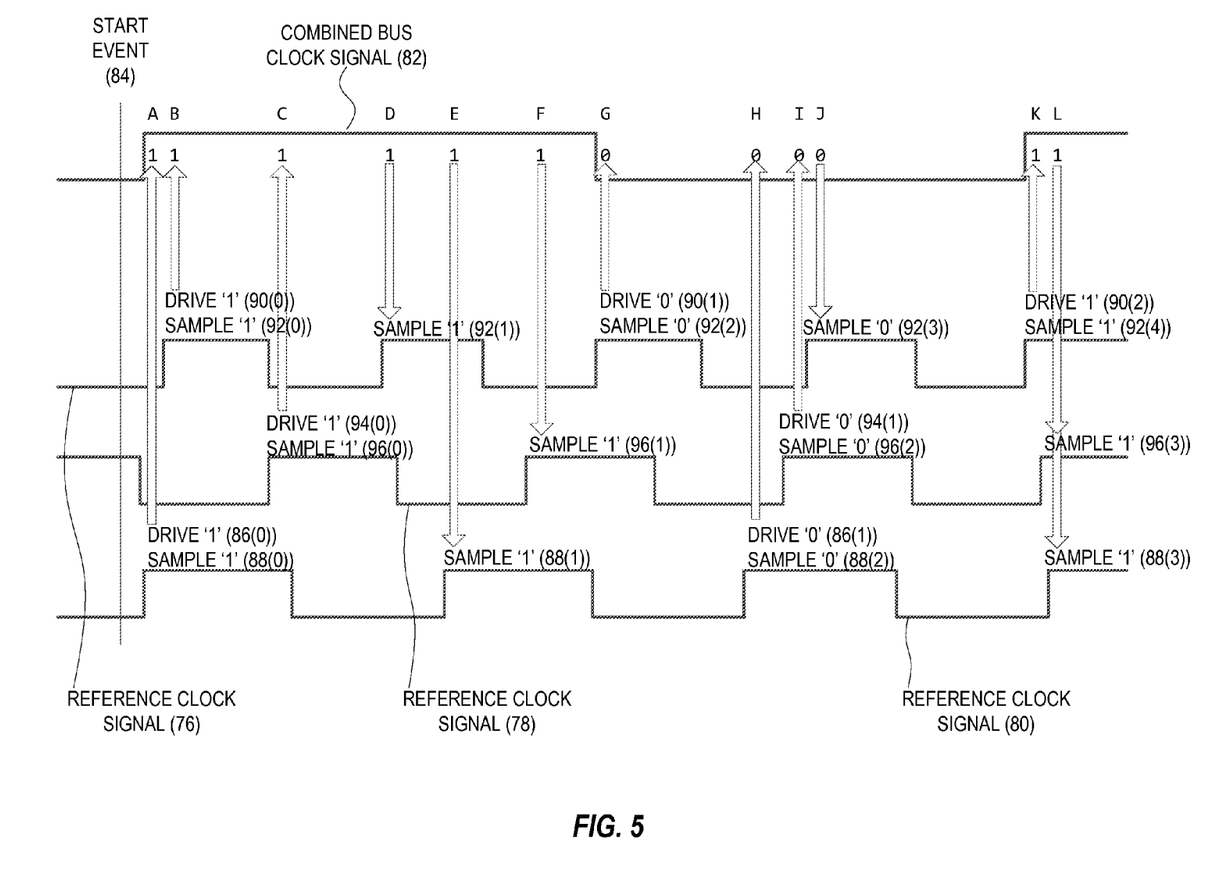
FIG. 5 is a timing diagram illustrating a combined bus clock signal generated by master devices such as the master devices of FIG. 4.

As described above, the driving of values to the shared clock line 56 of FIG. 4 according to exemplary aspects of the present disclosure results in emergence of a combined bus clock signal on the shared clock line 56. To illustrate this emergence, FIG. 5 is provided. FIG. 5 is a timing diagram showing three (3) reference clock signals 76, 78, and 80, which may correspond to the reference clock signals 74(1)-74(3) of the respective master devices 62(1)-62(3) of FIG. 4 (while only master devices 62(1) and 62(X) are shown, it should be appreciated that if X=3, that there are three (3) master devices 62(1)-62(3) with three (3) corresponding reference clock signals 74(1)-74(3)). In this example, the reference clock signals 76, 78, and 80 have duty cycles of 50%, with frequencies of 10, 12, and 14, respectively. The reference clock signals 76, 78, and 80 are used to generate a combined bus clock signal 82 on the shared clock line 56 of FIG. 4. The letters A-L above the combined bus clock signal 82 in FIG. 5 indicate points in time at which sampling and/or driving occurs. In this example, the driving of values to the shared clock line 56 is based on two (2) samples, and sampling and driving of values takes place when the reference clock signals 76, 78, and 80 each transition to one (1).

With continuing reference to FIG. 5, generating the combined bus clock signal 82 begins when a start event 84 is detected on the shared clock line 56 of FIG. 4. In some aspects, the start event 84 may comprise a zero (0) value being present on the shared clock line 56 for a predetermined time interval. It is to be assumed that two previous samples (not shown) of value 0 have been taken for each of the reference clock signals 76, 78, and 80. The start event 84 may represent, as a non-limiting example, a start of bus arbitration.

The reference clock signal 80 goes to 1 first at time point A. Because two previous samples (not shown) of value 0 have been taken for the reference clock signal 80 prior to the start event 84, a shared clock line drive value 86(0) inverse to the previous samples (i.e., 1) is driven to the shared clock line 56. The combined bus clock signal 82 thus goes to 1. At the same time, a shared clock line value 88(0) of 1 is sampled for the reference clock signal 80.

At time point B, the reference clock signal 76 transitions to 1. As with reference clock signal 80, two previous samples (not shown) of value 0 have been taken for the reference clock signal 76 prior to the start event 84. Accordingly, a shared clock line drive value 90(0) of 1 is driven to the shared clock line 56. However, the combined bus clock signal 82, having already been driven to 1, remains unchanged. A shared clock line value 92(0) of 1 is sampled for the reference clock signal 76.

Still referring to FIG. 5, the reference clock signal 78 transitions to 1 at time point C. A shared clock line drive value 94(0) of 1 is driven to the shared clock line 56, based on the two previous samples of value 0 taken for the reference clock signal 78 prior to the start event 84. As before, the combined bus clock signal 82, having already been driven to 1 at point A, remains unchanged.

At time point D, the reference clock signal 76 again transitions to 1. A shared clock line value 92(1) is sampled, and compared to the previously sampled shared clock line value 92(0). Because both the shared clock line value 92(0) and the shared clock line value 92(1) are 1, an inverse value of 0 will be driven at the next rising edge for the reference clock signal 76.

Similarly, at time point E, the reference clock signal 80 transitions to 1, causing a shared clock line value 88(1) to be sampled and compared to the previously sampled shared clock value 88(0). Both the shared clock line value 88(0) and the shared clock line value 88(1) are 1, so an inverse value of 0 will be driven at the next rising edge for the reference clock signal 80.

The reference clock signal 78 transitions to 1 at time point F, causing a shared clock line value 96(1) to be sampled and compared to the previously sampled shared clock line value 96(0). Both the shared clock line value 96(0) and the shared clock line value 96(1) are 1. As a result, an inverse value of 0 will be driven at the next rising edge for the reference clock signal 78.

With continued reference to FIG. 5, at time point G, the reference clock signal 76 transitions to 1. Because the two previously sampled shared clock line values 92(0) and 92(1) had a value of 1, a shared clock line drive value 90(1) of 0 is driven to the shared clock line 56. The combined bus clock signal 82 thus goes to 0. At the same time, a shared clock line value 92(2) of 0 is sampled for the reference clock signal 76.

The reference clock signal 80 transitions to 1 at time point H. Two shared clock line values 96(0) and 96(1) of value 1 have been previously sampled for the reference clock signal 80. Accordingly, a shared clock line drive value 86(1) of 0 is driven to the shared clock line 56. However, the combined bus clock signal 82, having already been driven to 0, remains unchanged. A shared clock line value 88(2) of 0 is sampled for the reference clock signal 80.

At time point I, the reference clock signal 78 transitions to 1. A shared clock line drive value 94(1) of 0 is driven to the shared clock line 56, based on the two shared clock line values 96(0) and 96(1) previously sampled. As before, the combined bus clock signal 82, having already been driven to 0 at point G, remains unchanged.

The reference clock signal 76 again transitions to 1 at time point J. A shared clock line value 92(3) is sampled, and compared to the previously sampled shared clock line value 92(2). Because both the shared clock line value 92(2) and the shared clock line value 92(3) are 0, an inverse value of 1 will be driven at the next rising edge for the reference clock signal 76.

Still referring to FIG. 5, the reference clock signal 76 transitions to 1 at time point K. The two previously sampled shared clock line values 92(2) and 92(3) had a value of 0, and therefore a shared clock line drive value 90(2) of 1 is driven to the shared clock line 56. The combined bus clock signal 82 thus goes to 1. At the same time, a shared clock line value 92(4) of 0 is sampled for the reference clock signal 76.

At time point L, both the reference clock signal 78 and the reference clock signal 80 transition to 1. A shared clock line value 96(3) is sampled, and compared to the previously sampled shared clock line value 96(2). Because the shared clock line value 96(2) and the shared clock line value 92(3) are different, no action will be taken at the next transition for the reference clock signal 78. Likewise, a shared clock line value 88(3) is sampled for the reference clock signal 80 and compared to the previously sampled shared clock line value 88(2). The shared clock line values 88(2) and 88(3) are different, and thus no action will be taken at the next transition for the reference clock signal 80. The process continues, resulting in the combined bus clock signal 82 having sufficiently minimal low/high periods to enable the combined bus clock signal 82 to serve as, e.g., a clock signal during arbitration.

Figure 6:
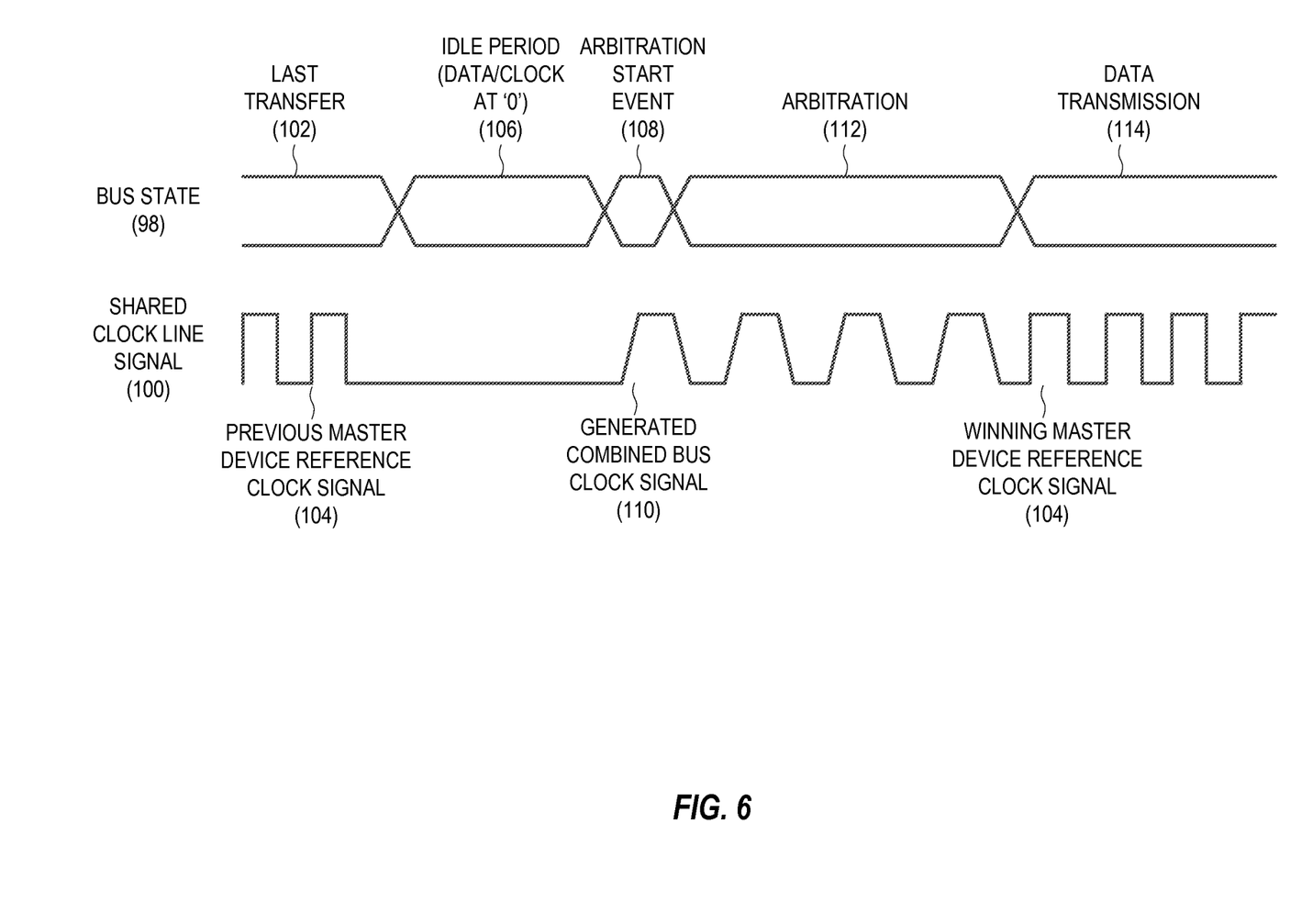
FIG. 6 is a diagram illustrating a clock signal on a shared clock line of the shared bus of FIG. 4 as the shared bus transitions through multiple states.

As discussed above, a combined bus clock signal generated according to aspects disclosed herein may be used for operations such as bus arbitration. In this regard, FIG. 6 is provided to illustrate how the combined bus clock signal 82 of FIG. 6 on the shared clock line 56 of the shared bus 52 of FIG. 4 may be used as the shared bus 52 transitions through multiple states. In FIG. 6, a bus state 98 represents a current activity of the shared bus 52, while a shared clock line signal 100 shows a current waveform propagating on the shared clock line 56. As a last transfer 102 of data completes, the shared clock line signal 100 reflects a reference clock signal 104 used by a previous master device 62 of FIG. 4. The bus state 98 then enters an idle period 106 during which both the shared data line 54 and the shared clock line 56 of the shared bus 52 are held at 0.

Upon one or more master devices 62 seeking access to the shared bus 52, an arbitration start event 108 occurs. The master devices 62 follow the protocol described in detail above to generate a combined bus clock signal 110. The combined bus clock signal 110 is then used by the master devices 62 throughout arbitration 112. Once a winning master device 62 is determined, data transmission 114 takes place using the reference clock signal 104 of the winning master device 62.

Figure 7:
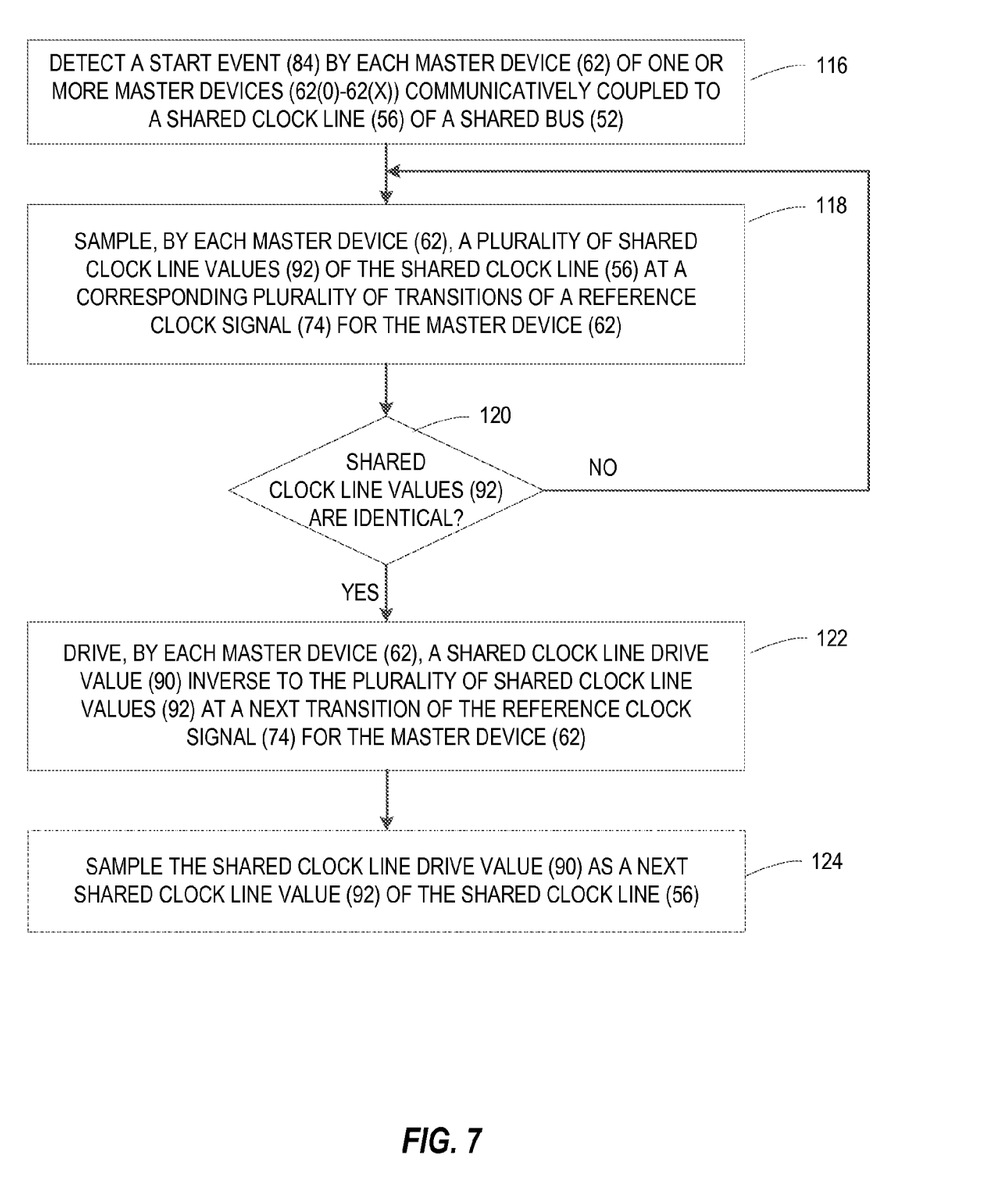
FIG. 7 is a flowchart illustrating an exemplary process for generating the combined bus clock signal of FIG. 5 by the master devices of FIG. 4.

To illustrate an exemplary process for generating the combined bus clock signal 82 of FIG. 5 by the master devices 62 of FIG. 4, FIG. 7 is provided. For the sake of clarity, elements of FIGS. 4 and 5 are referenced in describing FIG. 7. In FIG. 7, operations begin with detection of a start event 84 by each master device 62 of one or more master devices 62(0)-62(X) communicatively coupled to a shared clock line 56 of a shared bus 52 (block 116). The start event 84 may be, as a non-limiting example, a start of bus arbitration. Each master device 62 then samples a plurality of shared clock line values 92 of the shared clock line 56 at a corresponding plurality of transitions of a reference clock signal 76 for the master device 62 (block 118). According to some aspects disclosed herein, each transition of the plurality of transitions of the reference clock signal 76 may comprise a rising edge of the reference clock signal 76, or each transition may comprise a falling edge of the reference clock signal 76.

Each master device 62 determines whether the shared clock line values 92 are identical (block 120). Some aspects may provide that the plurality of shared clock line values 92 comprises two (2) sampled values, while some aspects may provide that the plurality of shared clock line values 92 comprises three (3) sampled values. If the plurality of shared clock line values 92 are determined to not be identical at block 120, processing resumes at block 118. If each master device 62 determines at block 120 that the plurality of shared clock line values 92 is identical, a shared clock line drive value 90 inverse to the plurality of shared clock line values 92 is driven at a next transition of the reference clock signal 76 for the master device 62 (block 122). In some aspects, each master device 62 may sample the shared clock line drive value 90 as a shared clock line value 92 of the shared clock line 56 (block 124). In this manner, the shared clock line drive value 90 may be used to override the shared clock line value 92 sampled at the same point that the shared clock line drive value 90 is driven to the shared clock line 56.

Generating combined bus clock signals using asynchronous master device reference clocks in shared bus systems according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable system device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for generating combined bus clock signals, comprising:
   detecting a start event by each master device of one or more master devices communicatively coupled to a shared clock line of a shared bus;
   sampling, by each master device, a plurality of shared clock line values of the shared clock line at a corresponding plurality of transitions of a reference clock signal for the master device;
   determining, by each master device, whether the plurality of shared clock line values is identical; and
   responsive to determining that the plurality of shared clock line values is identical, driving, by each master device, a shared clock line drive value inverse to the plurality of shared clock line values to the shared clock line at a next transition of the reference clock signal for the master device.

2. The method of claim 1, further comprising sampling the shared clock line drive value as a next shared clock line value of the shared clock line.

3. The method of claim 1, wherein:
   a ratio of a fastest reference clock signal and a slowest reference clock signal among reference clock signals for the one or more master devices is less than 4:3; and
   determining whether the plurality of shared clock line values is identical comprises determining whether two most recent shared clock line values are identical.

4. The method of claim 1, wherein:
   a ratio of a fastest reference clock signal and a slowest reference clock signal among reference clock signals for the one or more master devices is greater than or equal to 3:2; and
   determining whether the plurality of shared clock line values is identical comprises determining whether three most recent shared clock line values are identical.

5. The method of claim 1, wherein detecting the start event comprises detecting a start of bus arbitration among the one or more master devices for access to the shared bus.

6. The method of claim 1, wherein each transition of the plurality of transitions of the reference clock signal comprises a rising edge of the reference clock signal.

7. The method of claim 1, wherein each transition of the plurality of transitions of the reference clock signal comprises a falling edge of the reference clock signal.

8. A master device, comprising:
   a communications interface communicatively coupled to a shared bus comprising a shared clock line; and
   a control system configured to:
      detect a start event on the shared clock line;
      sample a plurality of shared clock line values of the shared clock line at a corresponding plurality of transitions of a reference clock signal for the master device;
      determine whether the plurality of shared clock line values is identical; and
      responsive to determining that the plurality of shared clock line values is identical, driving a shared clock line drive value inverse to the plurality of shared clock line values to the shared clock line at a next transition of the reference clock signal for the master device.

9. The master device of claim 8, further configured to sample the shared clock line drive value as a next shared clock line value of the shared clock line.

10. The master device of claim 8, configured to determine whether the plurality of shared clock line values is identical by determining whether two most recent shared clock line values are identical.

11. The master device of claim 8, configured to determine whether the plurality of shared clock line values is identical by determining whether three most recent shared clock line values are identical.

12. The master device of claim 8, configured to detect the start event by detecting a start of bus arbitration among one or more master devices for access to the shared bus.

13. The master device of claim 8, configured to sample the plurality of shared clock line values of the shared clock line at the corresponding plurality of transitions of the reference clock signal for the master device by sampling the plurality of shared clock line values at a corresponding plurality of rising edges of the reference clock signal.

14. The master device of claim 8, configured to sample the plurality of shared clock line values of the shared clock line at the corresponding plurality of transitions of the reference clock signal for the master device by sampling the plurality of shared clock line values at a corresponding plurality of falling edges of the reference clock signal.

15. The master device of claim 8 integrated into an integrated circuit (IC).

16. The master device of claim 8 integrated into a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

17. A master device, comprising:
a means for detecting a start event on a shared clock line of a shared bus;
a means for sampling a plurality of shared clock line values of the shared clock line at a corresponding plurality of transitions of a reference clock signal for the master device;
a means for determining whether the plurality of shared clock line values is identical; and
a means for, responsive to determining that the plurality of shared clock line values is identical, driving a shared clock line drive value inverse to the plurality of shared clock line values to the shared clock line at a next transition of the reference clock signal for the master device.

18. A non-transitory computer-readable medium having stored thereon computer-executable instructions to cause a processor to:
detect a start event on a shared clock line of a shared bus;
sample a plurality of shared clock line values of the shared clock line at a corresponding plurality of transitions of a reference clock signal;
determine whether the plurality of shared clock line values is identical; and
responsive to determining that the plurality of shared clock line values is identical, drive a shared clock line drive value inverse to the plurality of shared clock line values to the shared clock line at a next transition of the reference clock signal.

19. The non-transitory computer-readable medium of claim 18 having stored thereon computer-executable instructions to further cause the processor to sample the shared clock line drive value as a next shared clock line value of the shared clock line.

20. The non-transitory computer-readable medium of claim 18 having stored thereon computer-executable instructions to cause the processor to determine whether the plurality of shared clock line values is identical by determining whether two most recent shared clock line values are identical.

21. The non-transitory computer-readable medium of claim 18 having stored thereon computer-executable instructions to cause the processor to determine whether the plurality of shared clock line values is identical by determining whether three most recent shared clock line values are identical.

22. The non-transitory computer-readable medium of claim 18 having stored thereon computer-executable instructions to cause the processor to detect the start event by detecting a start of bus arbitration among one or more master devices for access to the shared bus.

23. The non-transitory computer-readable medium of claim 18 having stored thereon computer-executable instructions to cause the processor to sample the plurality of shared clock line values of the shared clock line at the corresponding plurality of transitions of the reference clock signal for a master device by sampling the plurality of shared clock line values at a corresponding plurality of rising edges of the reference clock signal.

24. The non-transitory computer-readable medium of claim 18 having stored thereon computer-executable instructions to cause the processor to sample the plurality of shared clock line values of the shared clock line at the corresponding plurality of transitions of the reference clock signal for a master device by sampling the plurality of shared clock line values at a corresponding plurality of falling edges of the reference clock signal.

25. A method for generating combined bus clock signals, the method comprising:
at a first master device:
detecting a start event at the first master device communicatively coupled to a shared clock line of a shared bus;
sampling, by the first master device, a plurality of shared clock line values of the shared clock line at a corresponding plurality of transitions of a reference clock signal for the first master device;
determining whether the plurality of shared clock line values is identical; and
responsive to determining that the plurality of shared clock line values is identical, driving, by the first master device, a shared clock line drive value inverse to the plurality of shared clock line values to the shared clock line at a next transition of the reference clock signal for the first master device; and
concurrently at a second master device:
detecting the start event at the second master device communicatively coupled to the shared clock line of the shared bus;
sampling, by the second master device, a second plurality of shared clock line values of the shared clock line at a corresponding second plurality of transitions of the reference clock signal for the second master device;

determining whether the second plurality of shared clock line values is identical; and responsive to determining that the second plurality of shared clock line values is identical, driving, by the second master device, a second shared clock line drive value inverse to the second plurality of shared clock line values to the shared clock line at the next transition of the reference clock signal for the second master device such that, collectively between actions of the first master device and the second master device, a combined clock signal is created on the shared clock line.

* * * * *